(No Model.)

U. HIMEL.
HORSE RAKE.

No. 594,083. Patented Nov. 23, 1897.

Witnesses:

Inventor
U. Himel
By James J. Sheehy
Attorney

UNITED STATES PATENT OFFICE.

ULISSE HIMEL, OF BALDWIN, LOUISIANA.

HORSE-RAKE.

SPECIFICATION forming part of Letters Patent No. 594,083, dated November 23, 1897.

Application filed October 3, 1896. Serial No. 607,769. (No model.)

*To all whom it may concern:*

Be it known that I, ULISSE HIMEL, a citizen of the United States, residing at Baldwin, in the parish of St. Mary's and State of Louisiana, have invented certain new and useful Improvements in Horse-Rakes; and I do declare the following to be a full, clear, and exact description of the invention, such as will enable others skilled in the art to which it appertains to make and use the same.

My invention relates to improvements in horse-rakes, such as are designed for raking hay, pea-vines, and the like; and its novelty and advantages will be fully understood from the following description and claim when taken in conjunction with the annexed drawings, in which—

Figure 1:
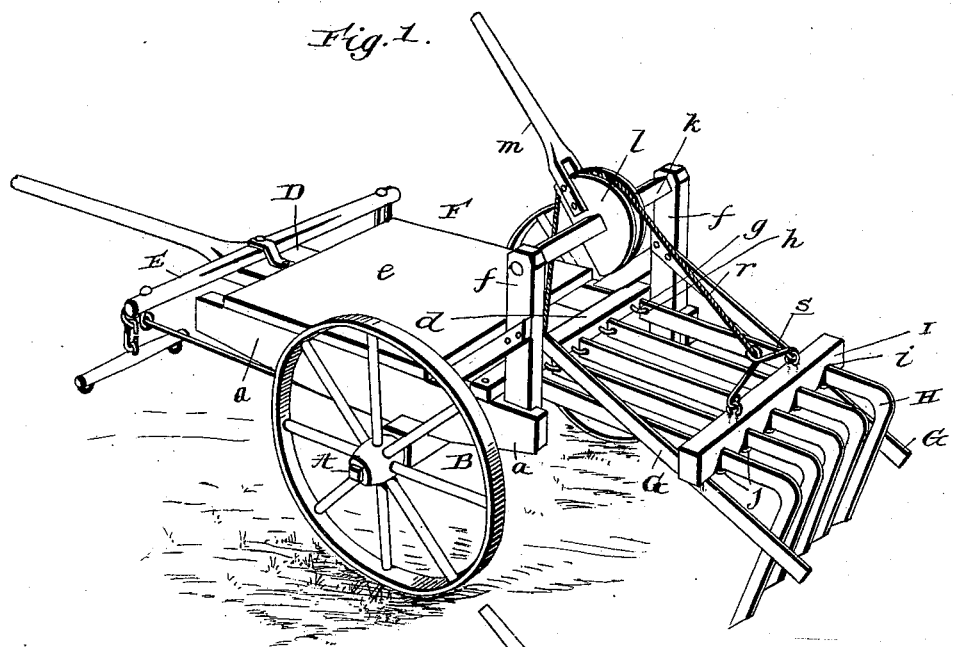
Figure 2:
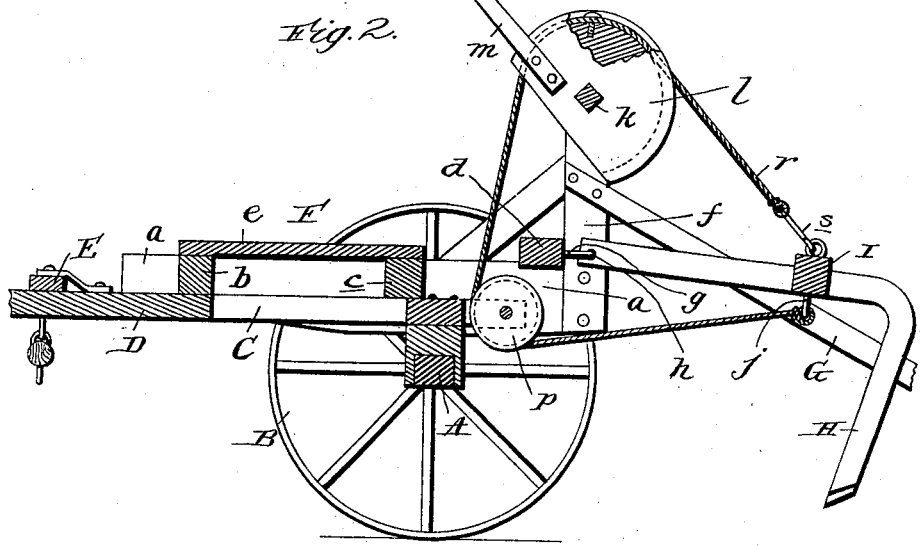

Figure 1 is a perspective view of my improved rake, and Fig. 2 is a longitudinal central section of the same with some of the parts in elevation.

Referring by letter to said drawings, A indicates the axle of my improved rake, which is provided at its ends with traveling wheels B.

C indicates hounds, which are connected to and extend forwardly from the axle.

D indicates the tongue, which is arranged between and fixedly connected to the hounds and is equipped with a suitable doubletree E, and F indicates the rake-body. This body F may be of any construction suitable to the purpose, but I prefer to have it comprise the longitudinal bars $a$, which are arranged upon and fixedly connected to the axle, the cross-bars $b$ $c$, which extend across the hounds C and are connected to the bars $a$, the rear cross-bar $d$, which is arranged upon and connected to the bars $a$, and the platform $e$, which is arranged upon and connected to the bars $a$ $b$ $c$ and is designed for the driver to stand upon, as will be presently described. The body F is provided at or adjacent to the rear ends of the bars $a$ with suitably-braced standards $f$, and to these standards are fixedly connected the parallel rearwardly and downwardly extending cleaner-bars G, which are designed to serve a purpose presently to be described.

H indicates the rake-teeth, which are arranged at suitable intervals between the cleaner-bars G, and are loosely connected at the forward ends of their tangs with the cross-bar $d$ of the body F, preferably through the medium of the staples $g$, which extend loosely through apertures $h$ in the tangs, as better illustrated in Fig. 2 of the drawings. The several teeth H, adjacent to the rear ends of their tangs, are arranged in notches $i$ of a cross-bar I, and are secured in said notches by staples $j$, which straddle the tangs and take into the bar I, as shown, whereby it will be seen that the said teeth are securely connected and may be raised and lowered together.

In order to enable the driver standing upon the platform $e$ to conveniently raise the teeth H and also to enable him to press and keep the teeth to the ground, so that they will not pass over any of the hay or pea-vines thereon, I provide the teeth-moving mechanism better illustrated in Fig. 2 of the drawings. This mechanism comprises the transverse shaft $k$, journaled in the standards $f$, the peripherally-grooved segment $l$, fixed on said shaft $k$ and forming part of a lever $m$, the sheave $p$, mounted in an arm connected to the axle A, and the strap $r$, connected at an intermediate point of its length to the peripherally-grooved segment $l$ and passing around the sheave $p$ and connected at one end to the under side of the bar I, preferably by one of the staples $j$, and at its opposite end with the upper side of said bar I, preferably through the medium of the loosely-connected bail $s$, as shown. In virtue of this construction it will be seen that the driver, standing upon the platform $e$, is enabled by raising the lever $m$ to press and hold the points or ends of the teeth H against the ground, so as to prevent said teeth from passing over the hay or pea-vines thereon, and is also enabled by pressing down upon the lever to raise the teeth H, so as to release the hay or pea-vines collected thereby and deposit the same in piles. It will also be seen that when the teeth H are raised, as described, the cleaner-bars G will clear the same of any hay or pea-vines which may cling thereto, which is an important advantage.

From the foregoing description, taken in connection with the drawings, it will be appreciated that while very cheap, simple, and easily constructed my improved rake is highly efficient in operation, is easily drawn, and may be operated by the driver with but a minimum amount of exertion, which is an important advantage.

I have in some respects specifically described the construction and relative arrangement of the several parts of my improved rake in order to impart a full, clear, and exact understanding of the same. I do not desire, however, to be understood as confining myself to such specific construction and arrangement, as such changes or modifications may be made in practice as fairly fall within the scope of my invention.

Having described my invention, what I claim is—

The horse-rake described comprising the body mounted on traveling wheels, the several parallel teeth loosely connected at their forward ends with the rear end of the body, the transverse bar connecting the several teeth together at an intermediate point of their length and having the pivoted bail $s$, on its upper side, the sheave mounted on the body and arranged in a plane below the connection of the several teeth, to the body, the segment mounted upon the body in a plane above the connection of the several teeth to the body and forming part of a hand-lever, and the strap connected at one end to the under side of the bar connecting the several teeth and at its opposite end to bail $s$ and passed under the sheave and over the segment and connected to said segment, substantially as and for the purpose set forth.

In testimony whereof I affix my signature in presence of two witnesses.

ULISSE HIMEL.

Witnesses:
R. C. CROSS,
C. EMMET ALPHA.